United States Patent [19]

McLeod

[11] 4,290,222
[45] Sep. 22, 1981

[54] FISHING APPARATUS

[75] Inventor: William D. McLeod, Westland, Mich.

[73] Assignee: Fishing Innovations, Inc., Westland, Mich.

[21] Appl. No.: 150,721

[22] Filed: May 19, 1980

[51] Int. Cl.³ .............................................. A01K 97/12
[52] U.S. Cl. ...................................................... 43/15
[58] Field of Search ....................................... 43/15, 16

[56] References Cited

U.S. PATENT DOCUMENTS

| | | | |
|---|---|---|---|
| 2,295,250 | 9/1942 | Zenewich | 43/15 |
| 2,578,887 | 12/1951 | Jackson et al. | 43/15 |
| 2,766,543 | 10/1956 | Beck | 43/16 |
| 2,810,981 | 10/1957 | Littau | 43/16 |
| 3,172,224 | 3/1965 | Parulski | 43/15 |
| 3,474,561 | 10/1969 | McConkey | 43/16 |

FOREIGN PATENT DOCUMENTS

| | | | |
|---|---|---|---|
| 984278 | 2/1951 | France | 43/15 |
| 1077494 | 4/1954 | France | 43/15 |

Primary Examiner—James L. Jones, Jr.
Attorney, Agent, or Firm—Charles W. Chandler

[57] ABSTRACT

Apparatus for jerking a fishline in response to a fish taking the bait on the end of the line, comprising a base, a one-piece, spring-biased wire arm having one end connected to the base, a trigger pivotally connected to the base and having a hook-shaped portion for engaging the arm such that a fishline connected to the outer end of the arm and through a hook-shaped portion of the trigger causes the trigger to release the arm in response to a fish taking the bait.

5 Claims, 3 Drawing Figures

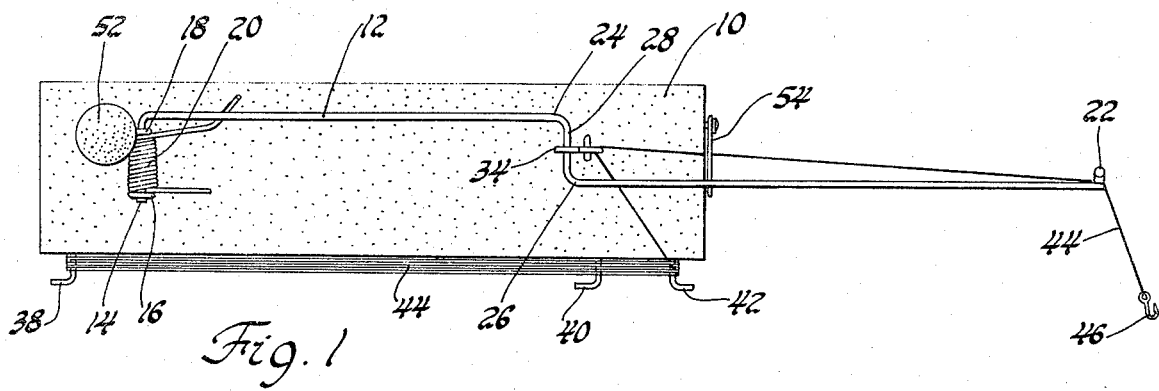
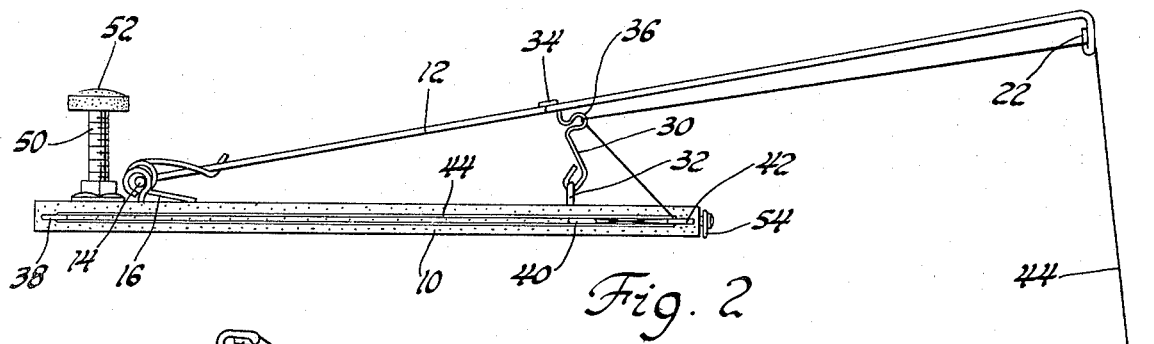
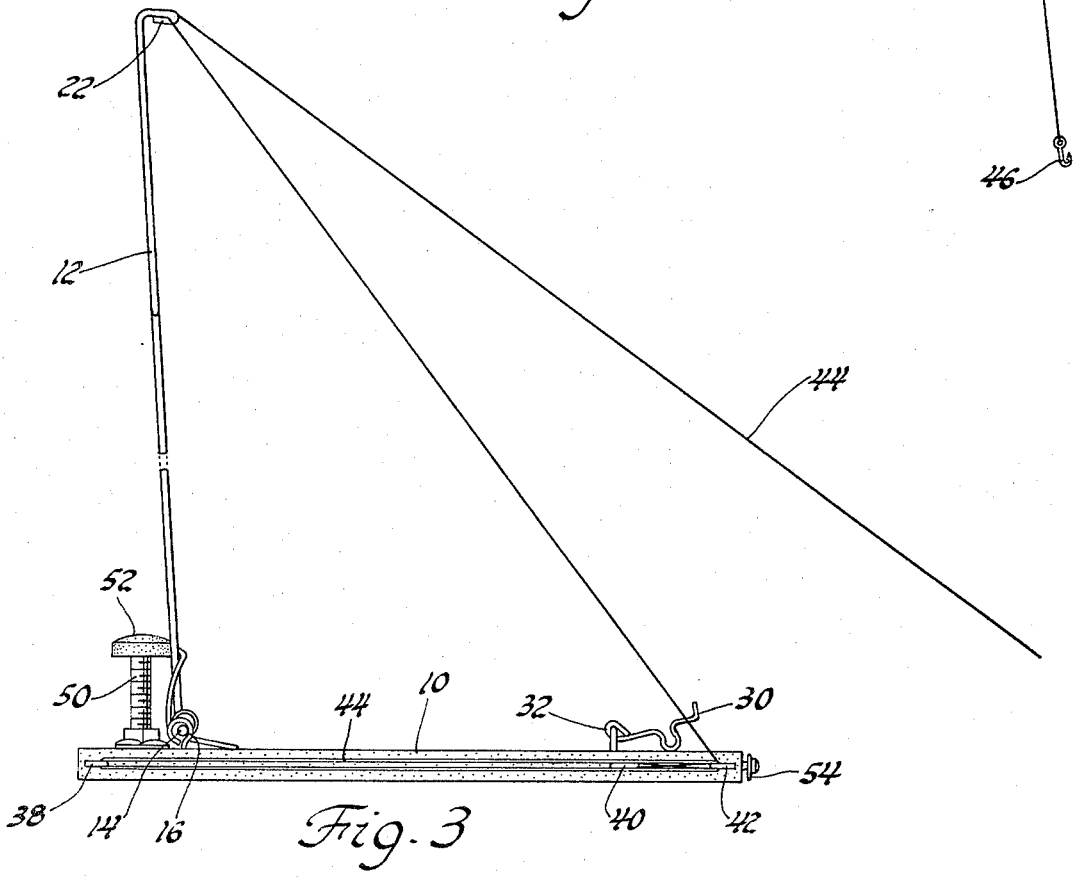

FISHING APPARATUS

BACKGROUND OF THE INVENTION

This invention is related to apparatus for setting a fishhook in response to the fish taking the bait on the end of the fishline.

There are a variety of devices in the prior art for automatically jerking a fishline when a fish takes the bait. Usually such arms employ a spring-loaded arm with a complicated mechanical triggering apparatus for releasing the arm in response to a motion of the fishline. Such art is to be found, for example, in U.S. Pat. Nos. 2,295,250, 3,474,561, and 3,172,224.

SUMMARY OF THE INVENTION

The broad purpose of the present invention is to provide an improved simplified apparatus for jerking a fishline in which the fishline is threaded through an elbow of the trigger such that a pulling motion of the fishline pulls the trigger away from the arm to release it. The preferred embodiment of the invention employs a one-piece arm and a one-piece trigger so that a complete apparatus can be formed of a relatively few components. The base of the apparatus has means for supporting a considerable length of fishline so that the user can unwind a selected length of the line to accomodate the water depth.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a plan view of the preferred apparatus showing the arm in its lowered position, engaged by the trigger;

FIG. 2 is an elevational view of the preferred apparatus in the position of FIG. 1; and FIG. 3 is an elevational view showing the arm in its released position.

DESCRIPTION OF THE PREFERRED EMBODIMENT

Referring to the drawing, the preferred apparatus comprises a flat base member 10 preferably formed of a lightweight strong plastic. An elongated arm 12 has a bent end 14. A pair of eye members 16 and 18 are attached to the base to receive the bent end of the arm so that it is pivotally supported with respect to the base between a lower position illustrated in FIG. 2 and a raised position illustrated in FIG. 3.

A coil spring 20 has one end engaged with the base and the other end hooked around the arm to bias it in the counterclockwise direction as viewed in FIG. 2.

The outer end of the arm has a line-receiving eye 22. The intermediate portion of the arm, approximately about half way along its length, has a pair of elbows 24 and 26 defining a section 28 supported transverse to the length of the arm.

A trigger member 30 is connected by an eye 32 to the base 10. The trigger member is also preferably formed of a length of wire and has its outer end shaped as a hook 34 for engaging the transverse section 28 of the arm. The trigger member also has a line-receiving elbow 36 adjacent the hook 34.

Referring to FIG. 1, three hooks 38, 40, and 42 support a length of fishline 44 which is wrapped around the hooks in a stored position. The unwound end of the fishline is looped around hooks 40 and 42 and then passes through elbow 36 and out through eye 22. A fishhook 46 is tied to the outer end of the fishline in the conventional manner.

Referring to FIGS. 2 and 3, a support member 50 carries a rubber bumper 52. The support 50 is attached to the base adjacent eye 18. The bumper 52 provides means for limiting the counterclockwise motion of the arm.

In use, the user moves the arm downwardly toward a lower position illustrated in FIG. 2 and against the bias of spring 20 until the hook 34 engages the transverse section 28 of the arm. He passes the fishline through elbow 36 out through eye 22. It is to be noted that that portion of the line between eye 22 and elbow 36 is generally parallel to the length of the arm. Thus a pulling motion on the line causes the trigger to swing outwardly toward the line-receiving eye 22 to thereby release the arm. When the arm is released, it jerks the line and hook 46 upwardly according to the bias of spring 20.

When a fish takes the bait, arm 12 jerks up and sets the hook. The position of the arm at this time is determined by the size and weight of the fish. With the spring tension on the arm, it allows the fish to have limited free play until being lifted from the water.

A hook-shaped retainer 54 is connected to the base for engaging the arm to hold it in its lower position for storage purposes and the like.

Having described my invention, I claim:

1. Apparatus for jerking a fishline, comprising:
a base;
an elongated arm having a first end, a section transverse to the longitudinal axis of the arm, and a line receiving eye at the opposite end of the arm;
means pivotally connecting the arm to the base for pivotal motion between a first position in which the transverse section is adjacent the base, and a second position;
a trigger member pivotally connected to the base, said trigger member having a hook engageable with the transverse section of the arm to prevent motion of the arm toward said second position, the hook being movable by a motion of the hook towards the eye of the arm for releasing the arm, the trigger member having an elbow for receiving a fishline;
a fishline having one end connected to the base and being disposed in the eye of the arm and through the elbow of the trigger member such that a pull on the line moves the trigger to release the arm for motion toward said second position; and
a bias member urging the arm from said first position toward said second position whereby the line is jerked as the arm is moved from said first position toward said second position.

2. Apparatus as defined in claim 1, in which said transverse section is about half way along the length of the arm.

3. Apparatus as defined in claim 1, including a bumper member mounted on the base adjacent the arm to limit the motion of the arm toward said second position.

4. Apparatus as defined in claim 1, including retainer means mounted on the base for holding the fishline whereby the length of the line jerked by the bias member is adjustable.

5. Apparatus as defined in claim 1, in which said arm is formed of a one-piece section of wire.

* * * * *